United States Patent
Lu et al.

(10) Patent No.: US 10,316,133 B2
(45) Date of Patent: Jun. 11, 2019

(54) CURABLE URETHANE (METH)ACRYLATE POLYMER COMPOSITIONS AND METHODS

(71) Applicant: Arkema France, Colombes (FR)

(72) Inventors: Jin Lu, West Chester, PA (US); Xiaoxing Dong, West Chester, PA (US)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/308,190

(22) PCT Filed: Apr. 28, 2015

(86) PCT No.: PCT/EP2015/059189
§ 371 (c)(1),
(2) Date: Nov. 1, 2016

(87) PCT Pub. No.: WO2015/169644
PCT Pub. Date: Nov. 12, 2015

(65) Prior Publication Data
US 2017/0051096 A1    Feb. 23, 2017

Related U.S. Application Data

(60) Provisional application No. 61/990,173, filed on May 8, 2014.

(51) Int. Cl.
*C08G 18/62*   (2006.01)
*C08G 18/67*   (2006.01)
*C08G 18/75*   (2006.01)
*C09D 175/14*  (2006.01)
(Continued)

(52) U.S. Cl.
CPC ....... *C08G 18/6208* (2013.01); *C08G 18/242* (2013.01); *C08G 18/6204* (2013.01);
(Continued)

(58) Field of Classification Search
CPC ............ C08G 18/6208; C08G 18/6204; C08G 18/242; C08G 18/672; C08G 18/755; C09D 175/14; C09J 175/14; C08L 175/14
See application file for complete search history.

(56) References Cited

U.S. PATENT DOCUMENTS

| | | |
|---|---|---|
| 4,031,066 A | 6/1977 | Mori et al. |
| 4,587,201 A | 5/1986 | Monkawa et al. |

(Continued)

FOREIGN PATENT DOCUMENTS

| | | |
|---|---|---|
| EP | 2620455 | 7/2013 |
| EP | 3053939 | 8/2016 |

(Continued)

*Primary Examiner* — Michael L Leonard
(74) *Attorney, Agent, or Firm* — Christopher Lewis (57) ABSTRACT

An ethylenically unsaturated polyurethane, which is an oligomer or polymer, results from the reaction of A) an alcohol component comprising: A1) at least one hydroxylated polydiene oligomer or polymer which may optionally be alkoxylated and A2) at least one hydroxyl-functional ethylenically unsaturated compound, which is a monomer or oligomer, bearing at least one ethylenic unsaturation and B) an isocyanate component comprising at least one polyisocyanate with a functionality of at least 2, wherein the molar ratio OH/NCO is greater than 1 and wherein said polyurethane bears reactive free hydroxyl groups. Such ethylenically unsaturated polyurethanes are useful as components of curable compositions such as coatings or adhesives.

16 Claims, 1 Drawing Sheet

(51) Int. Cl.
   *C09J 175/14*   (2006.01)
   *C08G 18/24*    (2006.01)
   *C08L 75/14*    (2006.01)
   *C09J 5/06*     (2006.01)
   *C09J 7/35*     (2018.01)

(52) U.S. Cl.
   CPC ......... *C08G 18/672* (2013.01); *C08G 18/755* (2013.01); *C08L 75/14* (2013.01); *C09D 175/14* (2013.01); *C09J 5/06* (2013.01); *C09J 7/35* (2018.01); *C09J 175/14* (2013.01); *C09J 2203/322* (2013.01); *C09J 2203/33* (2013.01)

(56) References Cited

U.S. PATENT DOCUMENTS

| | | | |
|---|---|---|---|
| 5,200,438 A * | 4/1993 | Fujii | C08G 18/672 522/96 |
| 7,192,688 B2 | 3/2007 | Kiang et al. | |
| 7,569,641 B2 * | 8/2009 | Fan | C08C 19/38 525/331.9 |
| 7,932,302 B2 | 4/2011 | Lu et al. | |
| 2007/0066757 A1 * | 3/2007 | Corcoran | C08F 265/04 525/194 |
| 2007/0179254 A1 * | 8/2007 | Wang | C08G 18/3206 525/440.072 |
| 2009/0286950 A1 * | 11/2009 | Schumann | C08G 18/0895 528/67 |
| 2011/0184125 A1 * | 7/2011 | Zhao | C08G 18/4288 525/131 |

FOREIGN PATENT DOCUMENTS

| | | |
|---|---|---|
| JP | 2002309185 A | 10/2002 |
| WO | WO 2005/068529 A1 | 7/2005 |
| WO | WO 2010/034699 A1 | 4/2010 |

\* cited by examiner

CURABLE URETHANE (METH)ACRYLATE POLYMER COMPOSITIONS AND METHODS

CROSS-REFERENCE TO RELATED APPLICATIONS

This application is a national stage application under 35 U.S.C. § 371 of PCT/EP2015/059189, filed Apr. 28, 2015, which claims benefit to U.S. patent application No. 61/990,173, filed May 8, 2014.

FIELD OF THE INVENTION

The present invention relates to specific curable urethane (meth)acrylate polymer or oligomer compositions; methods for making the compositions and products made by those methods.

BACKGROUND OF THE INVENTION

Urethane (meth)acrylate polymers, particularly polydiene urethane (meth)acrylates (oligomeric/polymeric substances containing polydiene segments, urethane linkages and (meth)acrylate functional groups), have broad applications in laminating adhesives and pressure sensitive adhesives, due to their low dielectric constant, excellent adhesion properties and moisture and oxygen barrier properties. However, the hydrophobic nature of these materials makes them difficult to formulate with other ingredients (e.g., tackifiers, acrylate monomers, photoinitiators, etc.), which limits their applications. The resins are also typically cloudy, which limits their uses in adhesives that are intended to be optically clear.

Examples of curable urethane (meth)acrylate polymer compositions include those described in U.S. Pat. Nos. 7,932,302; 7,192,688; 4,587,201; 4,031,066 and U.S. Publication No. 2007/0179254.

SUMMARY OF THE INVENTION

There remains a need for curable urethane (meth)acrylate polymer compositions that can deliver optical clarity, low color and that have greater compatibility with other ingredients typically found in adhesive formulations.

Embodiments of the present invention relate to polydiene urethane (meth)acrylate compositions, methods for making the compositions and products made by such methods. The applicants have discovered that polydiene urethane (meth) acrylates bearing one or more free hydroxyl groups, meaning that said polydiene diol has a part of its hydroxyls which remain free without urethane (meth)acrylate groups substituting OH, provide several advantages over conventional polydiene urethane (meth)acrylates. In fact said urethane (meth)acrylates obtained from hydroxylated polydiene, in particular diols, are a mixture of fully urethane(meth)acrylated polydiene and of mono urethane (meth)acrylated polydiene (monohydroxylated) and optionally of fully hydroxylated polydiene (but the latter in minor part). For example, the polydiene urethane (meth)acrylates of the present invention have greater compatibility with other ingredients typically found in adhesive formulations (particularly hydrophilic ingredients, such as tackifiers, acrylate monomers, photoinitiators, etc.) and deliver optical clarity. The polydiene urethane (meth)acrylates of the present invention are particularly advantageous when they are used as coatings or adhesives for electronic devices (e.g., devices with liquid-crystal displays, such as computer monitors, televisions, instrument panels, video players, gaming devices, clocks, watches, calculators, telephones, etc.), due to their enhanced optical clarity and excellent moisture resistance. They are also useful as a component of solar panels due to their low dielectric constant and high breakdown voltage.

Embodiments of the present invention relate to a reaction product (sometimes also referred to herein as a "polyurethane composition") which results from the reaction of:

A) an alcohol component comprising:
   A1) at least one hydroxylated and optionally alkoxylated hydroxylated polydiene oligomer or polymer, in particular diol, said polydiene optionally being hydrogenated and more particularly said polydiene being a polybutadiene oligomer or polymer or a hydrogenated polybutadiene oligomer or polymer containing isocyanate-reactive hydroxyl functionality, in particular of 2); and
   A2) at least one hydroxyl-functional ethylenically unsaturated compound, in particular hydroxyl mono functional (A2.1), which is a monomer or oligomer, bearing at least one ethylenic unsaturation (e.g., at least 2 or at least 3 ethylenic unsaturations, particularly (meth) acrylic unsaturations); and
B) an isocyanate component comprising at least one polyisocyanate with a functionality of at least 2, in particular 2, wherein the molar ratio OH/NCO is greater than 1, and wherein said reaction product is comprised of a polyurethane, which is an oligomer or polymer, ethylenically unsaturated, preferably (meth)acrylated urethane polymer or oligomer, bearing one or more reactive free hydroxyl groups per chain and one or more ethylenic unsaturations derived from A2) per chain, preferably with a number average molecular weight Mn from 1000 to 100000 Daltons.

Embodiments of the present invention also relate to a curable composition (polyurethane) comprising, consisting essentially of or consisting of the above-described reaction product. Said curable composition (polyurethane) may additionally comprise one or more further components selected from the group consisting of reactive diluents, non-reactive diluents, fillers, colorants, pigments, matting agents, tackifiers, plasticizers, rheology modifiers, antioxidants, stabilizers, wetting agents, flowing agents, adhesion promoters, catalysts and initiators. According to particular embodiments, a material comprising, consisting essentially of or consisting of said reaction product or curable composition is selected from the group consisting of coatings, adhesives, sealants, caulks, graphic arts compositions, inks, flexographic printing plate compositions and encapsulant compositions. According to additional embodiments, an electronic device (e.g., a device having a liquid-crystal display) includes an adhesive comprising, consisting essentially of or consisting of said reaction product or curable composition.

Embodiments of the present invention also relate to an ethylenically unsaturated, preferably (meth)acrylated, polyurethane polymer or oligomer of Formula (I) (sometimes referred to herein as an "ethylenically unsaturated polyurethane" or "(meth)acrylated polyurethane"):

$$X^1\text{—O—}R^1\text{—O—}[\text{—C(=O)—NH—}R^2\text{—NH—C}(\text{=O})\text{—O—}R^3\text{—O—}]_n\text{—}X^2 \quad (I)$$

wherein
$X^1$ and $X^2$ are each independently H or —C(=O)—NH—$R^4$—NH—C(=O)—O—$R^5$—[O—C(=O)—C($R^6$)=$CH_2]_m$, subject to the proviso that at least one of $X^1$ and $X^2$ is H;
n is an integer of from 1 to 20, more preferably from 1 to 10;
m varies from 1 to 5;

$R^1$ and $R^3$ are each independently a polydiene, an alkoxylated polydiene segment or a polyoxyalkylene segment, subject to the proviso that at least one $R^1$ or $R^3$ in the polymer is a polydiene segment or an alkoxylated polydiene segment, optionally with hydrogenated said polydiene segment;

$R^2$ and $R^4$ are each independently an organo residue of a diisocyanate;

$R^5$ is $C_2$ to $C_{10}$ alkylene or dialkylene ether (with ether bond linking two alkylenes and the total of C atoms being from 2 to 10 in said dialkylene ether radical); and $R^6$ is H or methyl, with an OH value (mean value) higher than 1 mg KOH/g, preferably between 1.01 and 20 mg KOH/g and with a number average molecular weight (measured by GPC) ranging from 1000 25 to 100000 Daltons.

In a more particular embodiment, the n value may vary from 1 to 5.

Parameter m as defined in Formula (I) is corresponding to the number of (meth)acrylate groups per group $X^1$ or $X^2$, in fact as issued from component A2), in particular A2.1) as defined above.

Embodiments of the present invention also relate to a polyurethane composition comprising, consisting essentially of or consisting of polydiene urethane (meth)acrylate, in particular polybutadiene urethane (meth)acrylate, preferably hydrogenated polybutadiene urethane (meth)acrylate, wherein one or more molecules of said polydiene (diol) urethane (meth)acrylate bears one or more free hydroxyl groups per chain and said composition has an OH (mean) value higher than 1, preferably between 1.01 to 20 mg KOH/g and said polydiene urethane (meth)acrylate has a Mn from 1000 to 100000 Daltons. The polyurethane composition may additionally comprise one or more further components selected from the group consisting of reactive diluents, non-reactive diluents, fillers, colorants, pigments, matting agents, tackifiers, plasticizers, rheology modifiers, antioxidants, stabilizers, wetting agents, flowing agents, adhesion promoters, catalysts and initiators.

Further embodiments of the present invention relate to a polyurethane composition comprising, consisting essentially of or consisting of polydiene urethane (meth)acrylate, wherein the polydiene urethane (meth)acrylate has an OH value greater than 1 mg KOH/g (e.g., at least 2 mg KOH/g, at least 5 mg KOH/g or at least 8 mg KOH/g).

Embodiments of the present invention also relate to a composition or mixture comprising said polyurethane composition blended with one or more additional components. According to particular embodiments, the polydiene urethane (meth)acrylate is polybutadiene urethane (meth)acrylate or hydrogenated polybutadiene urethane (meth)acrylate. The polyurethane composition is preferably curable by radiation (UV), electron beam, peroxides, hydroxyl-reactive curing agents or dual cure.

Embodiments of the present invention also relate to a curable composition comprising, consisting essentially of or consisting of the above-described polyurethane composition or ethylenically unsaturated polyurethane according to the present invention. According to particular embodiments, a material comprising, consisting essentially of or consisting of said curable polyurethane composition is selected from the group consisting of coatings, adhesives, sealants, caulks and encapsulants. According to additional embodiments, an electronic device (e.g., a device having a liquid-crystal display) includes an adhesive comprising, consisting essentially of or consisting of said polyurethane composition.

Embodiments of the present invention also relate to a method for making said polyurethane composition, the method comprising, consisting essentially of or consisting of reacting an alcohol component with an isocyanate component, wherein the alcohol component and the isocyanate component have a molar ratio of OH/NCO (i.e., the molar ratio of hydroxyl groups to urethane groups) that is greater than 1. The method may further comprise forming a blend, wherein the blend comprises, consists essentially of or consists of the alcohol component, the isocyanate component, at least one catalyst, optionally at least one inhibitor and optionally one or more (meth)acrylate monomers.

DETAILED DESCRIPTION OF THE INVENTION

An aspect of the present invention relates to a reaction product, wherein the reaction product (which may also be referred to as a polyurethane composition) results from the reaction of:
A) an alcohol component comprising:
  A1) at least one hydroxylated and optionally alkoxylated, polydiene oligomer or polymer, in particular diol (preferably a polybutadiene oligomer or polymer containing isocyanate-reactive hydroxyl functionality, more preferably a hydrogenated polybutadiene oligomer containing such an isocyanate-reactive hydroxyl functionality), and
  A2) at least one hydroxylfunctional ethylenically unsaturated compound in particular A2.1) hydroxyl monofunctional or A2.2) hydroxyl multifunctional with at least 2, preferably 2 OH, which is a monomer or oligomer, bearing at least one ethylenic unsaturation (preferably at least 2 and more preferably at least 3 ethylenic unsaturations, particularly (meth)acrylic unsaturations); and
B) an isocyanate component comprising at least one polyisocyanate with a functionality of at least 2, in particular 2, wherein the molar ratio OH/NCO is greater than 1 and wherein the reaction product is comprised of a polyurethane, which is an oligomer or polymer bearing one or more reactive free hydroxyl groups per chain (e.g., terminal OH groups directly linked to the polydiene oligomer or polymer) and one or more ethylenic unsaturations derived from A2) per chain, preferably with Mn ranging from 1000 to 100000 Daltons.

According to particular embodiments, the polydiene portion of the hydroxylated and optionally alkoxylated polydiene is polybutadiene, polyisoprene or a copolymer of butadiene and isoprene and optionally, the polydiene portion of the hydroxylated and optionally alkoxylated polydiene is a hydrogenated polydiene (wherein the polydiene may be partially or fully hydrogenated). The polydiene portion of the hydroxylated and optionally alkoxylated polydiene is preferably polybutadiene and most preferably hydrogenated polybutadiene. The number average molecular weight of the hydroxylated and optionally alkoxylated polydiene oligomer or polymer may be from about 500 Da (Daltons) to about 5000 Da or from about 1000 Da to about 4000 Da, for example. All Mn values are determined by Gel permeation chromatography in THF, using polystyrene calibration standards. All OH values are determined by Radiometer TitraLab® TM865 Autotitrator, according to the method as disclosed in details in the experimental part.

In one embodiment, the hydroxylated and optionally alkoxylated, polydiene oligomer or polymer contains an average of about 1.9 or more hydroxyl groups per chain. The hydroxyl groups may be terminal (i.e., at the ends of the polymer/oligomer chain) and/or positioned along the backbone of the polymer/oligomer chain. A1) of the alcohol component thus may be, for example, a 2-hydroxyalkyl-terminated polybutadiene, a 2-hydroxyalkyl-terminated polyisoprene, a 2-hydroxyalkyl-terminated polybutadiene that has been reacted with an epoxide such as ethylene oxide and/or propylene oxide to provide an alkoxylated polybutadiene or a 2-hydroxyalkyl-terminated polyisoprene that has been reacted with an epoxide such as ethylene oxide and/or propylene oxide to provide an alkoxylated polyisoprene, as well as partially and fully hydrogenated counterparts thereof. The hydroxyl groups may be primary and/or secondary. The polydiene portion of the hydroxylated and optionally alkoxylated polydiene may be free of unsaturations or may contain some amount of unsaturations (as a result, for example, of vinyl groups formed during polymerization of the diene(s) used to prepare the polydiene portion).

The alcohol component A) may optionally include A3) one or more additional types of monomeric, oligomeric and/or polymeric polyols that do not contain ethylenic unsaturation or polydiene segments, preferably at low levels; for example, glycols, aliphatic diols, polyester polyol(s), poly ether polyol(s) such as polypropylene glycols, polyethylene glycols and polytetramethylene glycols, etc. These monomeric, oligomeric and polymeric polyols may contain 2 or more hydroxyl groups per molecule.

Compounds suitable for use as A2) generally are compounds containing at least one hydroxyl group and at least one ethylenic unsaturation (carbon-carbon double bond) per molecule. In one embodiment, the ethylenic unsaturation is capable of being radiation cured (i.e., the ethylenically unsaturated polyurethane made from the compound A2) is able to be cured through reaction of the ethylenic unsaturation when the polyurethane is irradiated). According to one embodiment, the ethylenic unsaturation is part of a (meth) acrylate group (corresponding to the structure —O—C (=O)—CH=CH$_2$ or —O—C(=O)—C(CH$_3$)=CH$_2$). In other embodiments, the ethylenic unsaturation may be attributable to vinyl or allylic functionality in compound A2). According to particular embodiments, the compound A2) is selected from the group consisting of hydroxy alkyl (meth)acrylates (where, in one embodiment, alkyl is C$_2$ to C$_4$: ethyl, propyl, butyl), alkoxylated hydroxy alkyl (meth) acrylates (i.e., alkoxylated hydroxy alkyl (meth)acrylates); hydroxyl-functional epoxy (meth)acrylates; hydroxyl-functional multifunctional (meth)acrylates; hydroxyl-functional urethane (meth)acrylates; hydroxyl-functional polyether (meth)acrylates and hydroxyl-functional polyester (meth) acrylates. According to preferred embodiments, the compound A2) has a (meth)acrylate functionality (acrylate and/or methacrylate functionality) ranging from 1 to 5 (i.e., compound A2) contains 1 to 5 (meth)acrylate functional groups per molecule). In one embodiment, compound A2) has a hydroxyl functionality of 1 and this option is designated as A2.1). In other embodiments, compound A2) has a hydroxyl functionality of 2 or higher and this option is designated as A2.2) (i.e., compound A2.2) contains two or more hydroxyl groups per molecule). According to a particular embodiment in the said reaction product between A) and B), A) component besides A1) comprises as A2) a combination of compounds A2.1) and A2.2) and optionally A3) as defined above. In such a case, there are both terminal and lateral ethylenic unsaturations, preferably (meth)acrylic groups beared by said unsaturated polyurethane polymer or oligomer according to the present invention, issued from A2). According to another embodiment, A2) is limited to A2.1) which is monohydroxylated, in particular for adhesive applications.

Suitable hydroxy alkyl (meth)acrylates include esters of acrylic and methacrylic acid wherein the acid is esterified to provide a hydroxy alkyl group. The alkyl group may be, for example, a branched or straight chain C$_2$ to C$_{10}$ alkyl group such as ethyl, propyl, butyl, pentyl, hexyl, octyl, nonyl or decyl. The hydroxyl group may be at the terminal position of the alkyl group or along the chain of the alkyl group, with the hydroxyl group preferably being primary or secondary. The alkyl group optionally may be substituted with aromatic groups, halogen, etc. More than one hydroxyl group may be present on the alkyl group (for example, as in glycerin mono(meth)acrylate). The hydroxy alkyl (meth)acrylate may contain one, two or more (meth)acrylate groups per molecule. Examples of hydroxy alkyl (meth)acrylates useful in the present invention include, without limitation, 2-hydroxyethyl acrylate (HEA), 2-hydroxyethyl methacrylate (HEMA), 2-hydroxypropyl acrylate, 2-hydroxypropyl methacrylate, 3-hydroxypropyl (meth)acrylate, 2-hydroxybutyl (meth)acrylate, 3-hydroxybutyl (meth)acrylate, 4-hydroxybutyl (meth)acrylate, 2-hydroxy-3-phenoxypropyl (meth) acrylate, 3-chloro-2-hydroxypropyl (meth) acrylate, glycerin di (meth) acrylates, glycerin mono- and di(meth)acrylates, 2-hydroxy-1-acryloxy-3-(meth) acryloxypropane, trimethylolpropane mono- and di(meth) acrylates, ditrimethylol propane mono-, di- and tri (meth) acrylates, pentaerythritol mono- and di-(meth) acrylates, pentaerythritol mono-, di- and tri(meth)acrylates, dipentaerythritol mono-, di-, tri- and tetra(meth)acrylates, dipentaerythritol mono-, di-, tri-, tetra, and penta(meth)acrylates and the like and combinations thereof.

Suitable alkoxylated hydroxy alkyl (meth)acrylates include, but are not limited to, diethylene glycol mono (meth)acrylate, polyethylene glycol mono(meth)acrylates, dipropylene glycol mono(meth)acrylate, polypropylene glycol mono(meth)acrylates, mixed ethylene/propylene polyols which are monoesterified with a (meth)acrylate group, di(tetramethylene) glycol mono(meth)acrylate, polytetramethylene glycol mono(meth)acrylates and the like and combinations thereof.

Suitable hydroxyl-functional epoxy (meth)acrylates include, but are not limited to, monomeric and oligomeric compounds obtainable by reaction of an epoxy compound (such as an epoxy resin, e.g., a bisphenol A resin) with (meth)acrylic acid wherein ring-opening of the epoxy group by the (meth)acrylic acid introduces both hydroxyl and (meth)acrylate functionality. Examples of suitable commercially available hydroxyl-functional epoxy (meth)acrylates include the CN132 and CN116 products sold by Sartomer (division of Arkema), which are aliphatic epoxy acrylates having both methacrylate functionality and secondary hydroxyl functionality due to ring-opening of an epoxy group.

Suitable hydroxyl-functional polyester (meth)acrylates include, but are not limited to, mono(meth)acrylate esters of polyester polyols, wherein the polyester polyols are the condensation polymerization reaction products of diacids and diols.

Mixtures or combinations of different hydroxyl-functional ethylenically unsaturated compounds may be utilized in alcohol component A).

According to particular embodiments, the polyisocyanate B) is selected from aliphatic, cycloaliphatic and aromatic polyisocyanates (preferably aliphatic and/or cycloaliphatic polyisocyanates) and combinations thereof. In one embodiment, a diisocyanate or mixture of diisocyanates is used. Cycloaliphatic diisocyanates such as 3-isocyanatomethyl-3,5,5-trimethylcyclohexyl isocyanate (also referred to as isophorone diisocyanate or IPDI) may be utilized in one aspect of the invention. Other suitable polyisocyanates may include, without limitation, toluene diisocyanates (TDI), diphenylmethanediisocyanates, dicyclohexyldiisocyanates, tetramethyl xylene diisocyanates, hydrogenated tetramethyl xylene diisocyanates, hexamethylene diisocyanate (HDI), norborane diisocyanate (NBDI), trimethylenehexamethylene diisocyanates, naphthylene diisocyanates and the like (including isocyanate functional biurets thereof, allophonates thereof and isocyanurates thereof). Mixtures of different polyisocyanates may be employed.

The reaction product preferably has from 1 to 15 ethylenic unsaturations by chain (as used herein, an "ethylenic unsaturation" means a carbon-carbon double bond, such as is present in a (meth)acrylate functional group and not in polydiene if not hydrogenated). In various embodiments of the invention, the reaction product may have a density of ethylenic unsaturations (as measured as molecular weight per (meth)acrylate group) of from about 1 to about 150 kDa, from about 2 to about 100 kDa or from about 3 to about 50 kDa per (meth)acrylate group.

According to particular embodiments, the reaction product has an OH value of greater than 1 mg KOH/g or at least 1.01 mg KOH/g or at least 1.05 mg KOH/g or at least 1.10 mg KOH/g or at least 1.20 mg KOH/g or at least 1.30 mg KOH/g or at least 1.40 mg KOH/g or at least 1.50 mg KOH/g or at least 1.60 mg KOH/g or at least 1.70 mg KOH/g or at least 1.80 mg KOH/g or at least 1.90 mg KOH/g or at least 2.00 mg KOH/g or at least 2.50 mg KOH/g or at least 3.00 mg KOH/g or at least 3.50 mg KOH/g or at least 4.00 mg KOH/g.

According to additional embodiments, the reaction product has an OH value between 1.01 mg KOH/g and 20 mg KOH/g or between 1.01 mg KOH/g and 18 mg KOH/g or between 1.01 mg KOH/g and 16 mg KOH/g or between 1.01 mg KOH/g and 14 mg KOH/g or between 1.01 mg KOH/g and 12 mg KOH/g or between 1.01 mg KOH/g and 10 mg KOH/g or between 1.05 mg KOH/g and 20 mg KOH/g or between 1.05 mg KOH/g and 18 mg KOH/g or between 1.05 mg KOH/g and 16 mg KOH/g or between 1.05 mg KOH/g and 14 mg KOH/g or between 1.05 mg KOH/g and 12 mg KOH/g or between 1.05 mg KOH/g and 10 mg KOH/g or between 1.5 mg KOH/g and 20 mg KOH/g or between 1.5 mg KOH/g and 18 mg KOH/g or between 1.5 mg KOH/g and 16 mg KOH/g or between 1.5 mg KOH/g and 14 mg KOH/g or between 1.5 mg KOH/g and 12 mg KOH/g or between 1.5 mg KOH/g and 10 mg KOH/g or between 2 mg KOH/g and 20 mg KOH/g or between 2 mg KOH/g and 18 mg KOH/g or between 2 mg KOH/g and 16 mg KOH/g or between 2 mg KOH/g and 14 mg KOH/g or between 2 mg KOH/g and 12 mg KOH/g or between 2 mg KOH/g and 10 mg KOH/g.

According to a particular embodiment the said reaction product according to the present invention is comprised of a second (ethylenically unsaturated) polyurethane that does not bear reactive free hydroxyl groups. The OH mean value is higher than 1 mg KOH/g and preferably between 1.01 and 20 mg KOH/g.

According to a particular embodiment, the reaction product is comprised of an ethylenically unsaturated polyurethane, more particularly (meth)acrylated polyurethane, corresponding to the following Formula (I):

$$X^1-O-R^1-O-[-C(=O)-NH-R^2-NH-C(=O)-O-R^3-O-]_n-X^2 \quad (I)$$

wherein $X^1$ and $X^2$ are each independently H or $-C(=O)-NH-R^4-NH-C(=O)-O-R^5-[O-C(=O)-C(R^6)=CH_2]$ m, subject to the proviso that at least one of $X^1$ and $X^2$ is H;

n is an integer of from 1 to 20, more preferably 1 to 10;

m can vary from 1 to 5;

$R^1$ and $R^3$ are each independently a polydiene segment, an alkoxylated polydiene segment or a polyoxyalkylene segment, subject to the proviso that at least one $R^1$ or $R^3$ in the polymer is a polydiene segment or an alkoxylated polydiene segment;

$R^2$ and $R^4$ are each independently an organo residue of a diisocyanate;

$R^5$ is $C_2$ to $C_{10}$ alkylene or dialkylene ether (with ether bond linking two alkylenes and the total of C atoms being from 2 to 10 in said dialkylene ether); and $R^6$ is H or methyl, with OH (mean) value higher than 1 mg KOH/g, preferably between 1.01 and 20 mg KOH/g and a Mn ranging from 1000 to 100000 Daltons.

More particularly, the n value can be from 1 to 5.

According to a particular embodiment, said ethylenically unsaturated polyurethane, in particular (meth)acrylated polyurethane, is in the form of a mixture in the presence of a second ethylenically unsaturated, in particular (meth)acrylated, polyurethane according to same Formula (I), excepted that neither $X^1$ nor $X^2$ is H, both $X^1$ and $X^2$ being in fact identical and corresponding to a urethane group bearing m (meth)acrylate groups with m from 1 to 5 and according to: $-C(=O)-NH-R^4-NH-C(=O)-O-R^5-[O-C(=O)-C(R^6)=CH_2]_m$ with $R^4$, $R^5$ and $R^6$ being as defined above in the definition of Formula (I). Parameter m may be an integer if one compound A2) is used or more than one but with the same functionality m in ethylenic unsaturation, in particular in (meth)acrylic unsaturation. If compounds A2) with different functionalities m are used then the value m in the Formula (I) represents the average in number functionality m on all components A2) used (mixture of A2) components).

By way of further explanation, one or both ends of the ethylenically unsaturated polyurethane may be hydroxyl-terminated. For example, $X^1$ and $X^2$ may both be H (hydrogen). Alternatively, only one of $X^1$ or $X^2$ may be H. As will be readily appreciated by those skilled in the art, practice of the synthetic methods useful for making ethylenically unsaturated polyurethanes in accordance with the present invention will typically yield a reaction product that is an admixture of different ethylenically unsaturated polyurethanes. The individual polyurethanes present in such admixture may differ, for example, in molecular weight and also in the identity of their terminal (end) groups. As an example, an ethylenically unsaturated polyurethane reaction product produced in accordance with the invention may contain a fraction of polyurethane molecules wherein hydroxyl groups are present at both ends of the molecule, a fraction of polyurethane molecules having a hydroxyl group at one end of the molecule and a (meth)acrylate group at the other end of the molecule, as well as a fraction of polyurethane molecules having a (meth)acrylate group at both ends of the molecule. Thus, the reaction product may comprise ethylenically unsaturated polyurethane in accordance with Formula (I) as well as ethylenically unsaturated polyurethane in accordance with Formula (I), except that neither $X^1$ or $X^2$ is H (i.e., ethylenically unsaturated polyurethane that does not bear at least one hydroxyl group per chain, such as an ethylenically unsaturated polyurethane that is capped at each end with a (meth)acrylate group).

The (meth)acrylate end groups may be derived from the hydroxyalkyl (meth)acrylate(s) used as a reactant, the hydroxyl group of the hydroxyalkyl (meth)acrylate having been reacted with an isocyanate group of the polyisocyanate to form a urethane linkage. Thus, $R^5$ in Formula (I) corresponds to the alkyl group of the (mono)hydroxyalkyl (meth)acrylate reactant.

As previously stated, $R^1$ and $R^3$ in Formula (I) are each independently a polydiene segment, alkoxylated polydiene segment or a polyoxyalkylene segment, subject to the proviso that at least one $R^1$ or $R^3$ in the polymer is a polydiene segment or an alkoxylated polydiene segment. Thus, $R^1$ and $R^3$ may be the same as each other or different from each other. Where n is 2 or greater, the individual $R^3$ moieties present in the polyurethane may differ from each other. $R^1$ and $R^3$ may be derived from the at least one hydroxylated and optionally alkoxylated polydiene oligomer or polymer or the polyalkylene glycol used as a reactant, with a portion of the hydroxyl groups of such reactant having been reacted with isocyanate groups of the polyisocyanate to form urethane linkages. Some portion of such hydroxyl groups remain unreacted, however, as a consequence of utilizing an OH/NCO molar ratio greater than 1, thereby providing terminal hydroxyl groups in the ethylenically unsaturated polyurethane.

Generally speaking, it will be desirable for at least the majority (>50%) of the $R^1$ and $R^3$ segments in the polyurethane of Formula (I) to be polydiene and/or alkoxylated polydiene segments. In one embodiment, at least about 75% of the $R^1$ and $R^3$ segments are polydiene and/or alkoxylated polydiene segments. In another embodiment, no polyoxyalkylene segments are present.

As previously explained, $R^2$ and $R^4$ are each independently an organo residue of a diisocyanate. Thus, $R^2$ and $R^4$ may be the same as or different from each other. Moreover, in the case where n is 2 or greater, the multiple $R^2$ moieties present may differ from each other. As used herein, "an organo residue of a diisocyanate" means the organic moiety corresponding to the portion of the diisocyanate which was reacted to form the ethylenically unsaturated polyurethane (other than the two isocyanate groups). For example, where the diisocyanate used is hexamethylene diisocyanate [O═C═N—(CH$_2$)$_6$—N═C═O], the resulting $R^2$ or $R^4$ in the polyurethane will be hexamethylene [—(CH$_2$)$_6$—].

Another embodiment according to the present invention relates to a (meth)acrylated polyurethane composition, wherein it comprises a polydiene (in particular diol) urethane (meth)acrylate, preferably hydrogenated polydiene, more preferably, polybutadiene (in particular diol) urethane (meth)acrylate and wherein one or more molecules of said polydiene (in particular diol) urethane (meth)acrylate, preferably hydrogenated polydiene urethane (meth)acrylate, bears one or more terminal free hydroxyl groups per chain, wherein said composition has an OH value between 1.01 mg KOH/g and 20 mg KOH/g and wherein said hydrogenated polybutadiene (in particular diol) urethane (meth)acrylate has a number average molecular weight Mn between 1000 and 100000 Daltons.

The invention also relates to a method for making said ethylenically unsaturated polyurethane as defined above according to the present invention, wherein the method comprises reacting an alcohol component A) with an isocyanate component B), wherein the molar ratio of OH/NCO is greater than 1, and wherein
the alcohol component A) comprises:
A1) at least one hydroxylated and optionally alkoxylated hydroxylated polydiene oligomer or polymer, in particular diol; and
A2) at least one hydroxyl-functional ethylenically unsaturated compound, which is a monomer or oligomer, in particular A2.1) monohydroxylated, bearing at least one ethylenic unsaturation; and
the isocyanate component B) comprises at least one polyisocyanate with a functionality of at least 2, preferably 2.

The said method comprises according to a particular option forming a blend, wherein the blend comprises the alcohol component A), the isocyanate component B), at least one catalyst, optionally at least one inhibitor and optionally one or more (meth)acrylate-functionalized monomers as diluent.

According to another possibility in said method, A2) and the isocyanate component are reacted to form an intermediate product and the intermediate product is then reacted with A1).

Another embodiment of the present invention provides a composition or mixture comprising, consisting essentially of or consisting of said ethylenically unsaturated polyurethane blended with one or more additional compounds or substances. Such composition may be curable, in particular radiation curable. According to particular embodiments, a curable composition comprises, consists essentially of or consists of the ethylenically unsaturated polyurethane (e.g., the ethylenically unsaturated polyurethane is preferably curable by radiation, electron beam, peroxides, hydroxyl-reactive curing agents or dual cure).

In addition to one or more ethylenically unsaturated polyurethanes in accordance with the present invention, a composition or product may comprise, consist essentially of or consist of one or more components selected from the group consisting of reactive diluents, non-reactive diluents, fillers, colorants, pigments, matting agents, tackifiers, plasticizers, rheology modifiers, antioxidants, stabilizers (including UV stabilizers), wetting agents, flowing agents, adhesion promoters, photoinitiators, catalysts, initiators (including photoinitiators) or any other additives known in the art. Reactive diluents include any of the substances known in the art which are capable of being cured in the same manner as the ethylenically unsaturated polyurethanes of the present invention, including, for example, any of the (meth) acrylate-functionalized monomers and oligomers known in the art.

Non-limiting examples of the types of materials that may comprise, consist essentially of or consist of the ethylenically unsaturated polyurethane include coatings, adhesives, sealants, caulks, encapsulant compositions, graphic arts compositions, inks, flexographic printing plates, etc. Any of the materials may include the ethylenically unsaturated polyurethane blended with one or more additional compounds. According to a preferred embodiment, an adhesive comprises, consists essentially of or consists of the ethylenically unsaturated polyurethane of the present invention.

According to additional embodiments, an electronic device includes the ethylenically unsaturated polyurethane as a coating or adhesive (e.g., the ethylenically unsaturated polyurethane may be included as a coating or adhesive for a liquid-crystal display). Non-limiting examples of electrical devices include computer monitors, televisions, instrument panels, video players, gaming devices, clocks, watches, calculators, telephones, etc.

Embodiments of the present invention also relate to a polymer (an ethylenically unsaturated polyurethane) of Formula (I):

wherein
$X^1$ and $X^2$ are each independently H or —C(=O)—NH—$R^4$—NH—C(=O)—O—$R^5$—[O—C(=O)—C($R^6$)=CH$_2$]$_m$, subject to the proviso that at least one of $X^1$ and $X^2$ is H;
n is an integer of from 1 to 20, more preferably from 1 to 10;
m can vary from 1 to 5;
$R^1$ and $R^3$ are each independently a polydiene segment, an alkoxylated polydiene segment or a polyoxyalkylene segment, subject to the proviso that at least one $R^1$ or $R^3$ in the polymer is a polydiene segment or an alkoxylated polydiene segment;
$R^2$ and $R^4$ are each independently an organo residue of a diisocyanate;
$R^5$ is $C_2$ to $C_{10}$ alkylene (e.g., ethylene, propylene, butylene) or dialkylene ether (e.g., ditrimethylene propane ether, dipentaerythritylene ether); and
$R^6$ is H or methyl.

More particularly, n value may vary from 1 to 5.

Another aspect of the present invention relates to a polyurethane composition comprising, consisting essentially of or consisting of polydiene urethane (meth)acrylate, wherein one or more molecules of the polydiene urethane (meth)acrylate bears one or more free hydroxyl groups per chain (e.g., one or more terminal free hydroxyl groups per chain). Another embodiment of the present invention provides a polyurethane composition comprising, consisting essentially of or consisting of polydiene urethane (meth)acrylate, wherein the polydiene urethane (meth)acrylate has an OH value greater than 1 mg KOH/g. The polyurethane composition is preferably curable by radiation, electron beam, peroxides, hydroxyl-reactive curing agents or dual cure (e.g., by radiation and/or peroxide cure, by radiation cure and/or reaction with hydroxyl-reactive curing agents, such as polyisocyanates or the like). Another embodiment of the present invention provides a composition or mixture comprising, consisting essentially of or consisting of said polyurethane composition blended with one or more additional compounds (e.g., one or more different compounds that do not include polydiene urethane (meth)acrylate bearing one or more free hydroxyl groups per molecule).

According to particular embodiments, the polydiene urethane (meth)acrylate has an OH value of at least 1.01 mg KOH/g or at least 1.05 mg KOH/g or at least 1.10 mg KOH/g or at least 1.20 mg KOH/g or at least 1.30 mg KOH/g or at least 1.40 mg KOH/g or at least 1.50 mg KOH/g or at least 1.60 mg KOH/g or at least 1.70 mg KOH/g or at least 1.80 mg KOH/g or at least 1.90 mg KOH/g or at least 2.00 mg KOH/g or at least 2.50 mg KOH/g or at least 3.00 mg KOH/g or at least 3.50 mg KOH/g or at least 4.00 mg KOH/g.

According to alternative embodiments, the polydiene urethane (meth)acrylate has an OH value of between 1.01 mg KOH/g and 20 mg KOH/g or between 1.01 mg KOH/g and 18 mg KOH/g or between 1.01 mg KOH/g and 16 mg KOH/g or between 1.01 mg KOH/g and 14 mg KOH/g or between 1.01 mg KOH/g and 12 mg KOH/g or between 1.01 mg KOH/g and 10 mg KOH/g or between 1.05 mg KOH/g and 20 mg KOH/g or between 1.05 mg KOH/g and 18 mg KOH/g or between 1.05 mg KOH/g and 16 mg KOH/g or between 1.05 mg KOH/g and 14 mg KOH/g or between 1.05 mg KOH/g and 12 mg KOH/g or between 1.05 mg KOH/g and 10 mg KOH/g or between 1.5 mg KOH/g and 20 mg KOH/g or between 1.5 mg KOH/g and 18 mg KOH/g or between 1.5 mg KOH/g and 16 mg KOH/g or between 1.5 mg KOH/g and 14 mg KOH/g or between 1.5 mg KOH/g and 12 mg KOH/g or between 1.5 mg KOH/g and 10 mg KOH/g or between 2 mg KOH/g and 20 mg KOH/g or between 2 mg KOH/g and 18 mg KOH/g or between 2 mg KOH/g and 16 mg KOH/g or between 2 mg KOH/g and 14 mg KOH/g or between 2 mg KOH/g and 12 mg KOH/g or between 2 mg KOH/g and 10 mg KOH/g.

According to particular embodiments, the polydiene urethane (meth)acrylate is polybutadiene urethane (meth)acrylate, polyisoprene urethane (meth)acrylate, a copolymer of polybutadiene urethane (meth)acrylate and polyisoprene urethane (meth)acrylate butadiene or a combination thereof. Preferably, the polydiene urethane (meth)acrylate is polybutadiene urethane (meth)acrylate and more preferably the polydiene urethane (meth)acrylate is hydrogenated polybutadiene urethane (meth)acrylate.

According to particular embodiments, the polydiene urethane (meth)acrylate has a number average molecule weight between 1000 Da and 100000 Da or between 1500 Da and 50000 Da or between 2000 Da and 25000 Da or between 2500 Da and 15000 Da. According to particular embodiments, the polydiene urethane (meth)acrylate has up to 20 repeat units or up to 10 repeat units, most preferably up to 5 repeat units (e.g., 2, 3, 4 or 5 repeat units).

According to preferred embodiments, the reaction product (polyurethane composition) of the present invention is optically clear (i.e., the composition is not visually cloudy or hazy). For example, the composition preferably has a color below 100 APHA, below 50 APHA or preferably below 25 APHA or between 1 APHA and 100 APHA or between 1 APHA and 50 APHA or between 1 APHA and 25 APHA and/or a haze value below 50, below 25 or preferably below 10 or between 1 and 50 or between 1 and 25 or between 1 and 10 at room temperature (e.g., as measured in accordance with the methods described in the Example section herein). Color and clarity are separate and distinct properties of a polyurethane composition. It is possible for a composition to have high clarity and high color, for example. According to a preferred embodiment, the polyurethane composition of the present invention has high clarity (i.e., a low haze value, most preferably below 10). According to another embodiment, the polyurethane composition of the present invention has low color (e.g., below 25 APHA). According to an exemplary embodiment, the polyurethane composition of the present invention has both high clarity (e.g., a haze value below 10) and low color (e.g., below 25 APHA).

It is also part of the present invention, a curable composition comprising the reaction product, in particular the ethylenically unsaturated polyurethane as defined above or the polyurethane polymer or oligomer as defined according to Formula (I) or the polyurethane composition comprising specific polydiene urethane (meth)acrylate as defined above according to the disclosure of the present invention. More particularly, it is curable by radiation in particular by UV, laser, LED or EB (electron beam) or by peroxide cure or dual cure or by cure with hydroxyl-reactive compounds. Dual cure means combination of two of the cited cure routes for example UV and peroxide cure. Cure with hydroxyl-reactive compounds means cure with compounds bearing at least two groups reactive with OH, as for example polyisocyanates, such as methylene diphenyl diisocyanate or blocked polyisocyanate compounds.

Preferably, the said curable composition according to the invention may be a coating composition or an adhesive composition, in particular for electronic devices or as a component for/in solar panels or as a component in battery or in inkjet printing microcircuits or a sealant composition or an encapsulant composition or flexographic printing plate composition. The curable composition depending on the final application may further comprise at least one further component selected from the group consisting of reactive diluents, non-reactive diluents, fillers, colorants, pigments, matting agents, tackifiers, plasticizers, rheology modifiers, antioxidants, stabilizers, wetting agents, flowing agents, adhesion promoters, catalysts and initiators.

A material comprising the said curable composition is also an object of the present invention, which is selected from the group consisting of coatings, particularly paints or varnishes or consisting of adhesives, sealants, caulks, graphic arts compositions, inks, flexographic printing plate compositions and encapsulant compositions.

Said material is preferably an adhesive, more particularly for electronic devices or as a component for solar panels or as a component in battery or in inkjet printing microcircuits. An electronic device comprising said adhesive is also part of the present invention.

Another subject of the invention relates with the use of the product according to the present invention, reaction product as defined above or the polyurethane polymer or oligomer as defined according to Formula (I) and related mixture or of a polyurethane composition comprising the specific polydiene urethane (meth)acrylate as defined above or of a curable composition as defined above, in coatings or adhesive compositions, in particular for electronic devices or as a component for/in solar panels or as a component in battery or in inkjet printing microcircuits, more particularly in touch screen devices. More particularly, it relates to a method of preparing coatings or adhesive compositions for electronic devices or as a component in solar panels or as a component in battery, or in inkjet printing microcircuits, or in touch screen devices, comprising using a reaction product, or from a polyurethane polymer or oligomer as defined above according to the invention or from a polyurethane composition, or from a curable composition as defined above according to the invention.

The invention also relates to an adhesive, in particular cured adhesive which results from the use of at least one reaction compound or product or the use of at least one polyurethane polymer or oligomer according to Formula (I) and related mixture or of a polyurethane composition as defined above or of a curable composition as defined above according to the present invention.

An additional embodiment provides a curable polyurethane comprising, consisting essentially of or consisting of the polyurethane composition of the present invention. Non-limiting examples of materials that may comprise, consist essentially of or consist of the polyurethane composition of the present invention include coatings, adhesives, sealants, caulks, encapsulant compositions, graphic arts compositions, inks, flexographic printing plates, etc. As described herein, any of the materials may include the polyurethane composition blended with one or more additional components. According to a preferred embodiment, an adhesive comprises, consists essentially of or consists of the polyurethane composition of the present invention. According to additional embodiments, an electronic device includes the polyurethane composition as a coating or adhesive (e.g., the polyurethane composition may be included as a coating or adhesive for a liquid-crystal display).

Another aspect of the present invention relates to a method for making the above-described polydiene urethane (meth)acrylate having one or more molecules bearing one or more free hydroxyl groups per chain, the method comprising, consisting essentially of or consisting of reacting an alcohol component (as described herein) with an isocyanate component (as described herein), wherein the amounts of the alcohol component and the isocyanate component are selected to provide a molar ratio of OH/NCO (i.e., molar ratio of hydroxyl groups to urethane groups) that is greater than 1 (that is, the relative amounts of the alcohol component and the isocyanate component are selected such that there is a stoichiometric excess of hydroxyl groups; this stoichiometric excess results in free reactive hydroxyl groups being present in the polydiene urethane (meth) acrylate obtained as a product from the reaction of the alcohol component and the isocyanate component). The OH/NCO ratio may be, for example, in different embodiments of the invention, greater than about 1.01, greater than about 1.05 or greater than about 1.1. The OH/NCO ratio may, in other embodiments, be selected to be no greater than about 2.0 or no greater than about 1.5. The OH/NCO ratio may be adjusted as may be desired to achieve a certain degree of chain extension in the reaction product (i.e., the molecular weight of the reaction product will be dependent to at least some extent on the OH/NCO ratio that is selected, with lower ratios generally favoring greater chain extension).

According to particular embodiments, the method further includes a step of forming a blend, wherein the blend comprises, consists essentially of or consists of the alcohol component, the isocyanate component, at least one catalyst (e.g., dibutyltin dilaurate), optionally at least one inhibitor (e.g., trisnonylphenylphosphite and/or thiodiethylene bis[3-(3,5-di-tert-butyl-4-hydroxyphenyl)proprionate)) and optionally one or more (meth)acrylate monomers (e.g., isobornyl acrylate, n-decyl acrylate and/or n-octyl acrylate). The method may further comprise controlling the reaction between the alcohol component and isocyanate component and the amounts of such components to achieve a molar ratio of OH/NCO that is greater than 1 and to provide the polydiene urethane (meth)acrylate which bears one or more free hydroxyl groups on at least one of the chains. One or more catalysts may be present in the blend to accelerate the desired reaction between the isocyanate groups of the isocyanate component and the hydroxyl groups of the alcohol component. The reactants may be combined and held at a temperature and for a time effective to complete this reaction (as a consequence of the molar excess of OH relative to NCO, the reaction is typically considered complete when the NCO level in the reaction product falls below 0.06% by weight).

According to one embodiment (such as when a monohydroxyl-functional ethylenically unsaturated compound is being utilized as a reactant), an isocyanate component is first reacted with a monohydroxyl-functional ethylenically unsaturated compound such as 2-hydroxyethylacrylate (optionally, in the presence of one or more non-hydroxyl-functional (meth)acrylate monomers or other diluents) until the monohydroxyl-functional ethylenically unsaturated compound is consumed (i.e., completely reacted with the isocyanate component). The intermediate reaction product thereby obtained is then further reacted with at least one hydroxylated and optionally alkoxylated polydiene oligomer or polymer to provide the ethylenically unsaturated polyurethane. This approach helps to ensure that all of the monohydroxyl-functional (meth)acrylate has been reacted and that the ethylenically unsaturated polyurethane bears the desired free reactive hydroxyl groups.

The embodiments described herein are intended to be exemplary of the invention and not limitations thereof. One skilled in the art will appreciate that modifications to the embodiments and examples of the present disclosure may be made without departing from the scope of the present disclosure.

The embodiments of the invention are described above using the term "comprising" and variations thereof. However, it is the intent of the inventors that the term "comprising" may be substituted in any of the embodiments described herein with "consisting of" and "consisting essentially of" without departing from the scope of the invention. Unless specified otherwise, all values provided herein include up to and including the starting points and end points given.

The following examples further illustrate embodiments of the invention and are to be construed as illustrative and not in limitation thereof.

EXAMPLES

Example 1

The components and respective amounts used in Example 1 are shown in Table 1.

TABLE 1

| Component | Amount |
| --- | --- |
| 3-isocyanatomethyl-3,5,5-trimethylcyclohexyl isocyanate | 46.71 grams |
| Trisnonylphenylphosphite | 0.47 grams |
| Thiodiethylene bis[3-(3,5-di-tert-butyl-4-hydroxyphenyl)proprionate | 0.93 grams |
| Dibutyltin dilaurate | 0.42 grams |
| 2-hydroxyethyl acrylate | 24.87 grams |
| Krasol ® HLBH-P3000 supplied by Cray Valley | 393 grams |

The OH/NCO molar ratio in this example was 1.07. First, 46.71 grams of 3-isocyanatomethyl-3,5,5-trimethylcyclohexyl isocyanate, 0.47 grams of trisnonylphenylphosphite (inhibitor), 0.93 grams of thiodiethylene bis[3-(3,5-di-tert-butyl-4-hydroxyphenyl)proprionate (Irganox® 1035; inhibitor) and 0.42 grams of dibutyltin dilaurate (catalyst) were charged into a 1 L reaction flask equipped with an agitator, liquid addition funnel, thermometer and gas inlet tube. This mixture was heated to 40° C. under agitation and dry air sparge. Next, 24.87 grams of 2-hydroxyethyl acrylate were charged over 25 minutes. After the exotherm, the flask was heated to 60° C. and held for 30 minutes. Then, 393 grams of 1,3-butadiene, homopolymer, hydrogenated, 2-hydroxyethyl-terminated (Krasol® HLBH-P3000) were charged over 30 minutes. After the exotherm, the reactor was heated to 85° C. The reaction was held at 85° C. for at least 3 hours, until the level of NCO % was equal to or lower than 0.06%. The heater and agitation were turned off. Once the reactor temperature cooled to 60° C., the product was poured out into a container and testing on the final properties was performed.

Properties of Example 1

The resulting product was a clear liquid having a viscosity of 37900 cP (mPa·s) at 60° C. (as measured by a Brookfield viscometer).

The molecular weight and polydispersity of Example 1 were determined by conventional gel permeation chromatography (GPC). A small sample was dissolved in tetrahydrofuran (THF) and injected into a liquid chromatograph (Agilent 1100 Series) equipped with HP PLGel® GPC columns (5 um, 100 A, 250×4.6 mm; 3 um MiniMix-E, 250×4.6 mm and 5 um MiniMix-D, 250×4.6 mm). The components of the sample were separated by the GPC columns based on their molecular sizes in solution. The components were detected by a Hewlett-Packard 1047A® refractive index detector and recorded by Agilent HPLC Chemstation® and Polymer Laboratories GPC software. Polystyrene standards of known molecular weight and narrow dispersity were used to generate a calibration curve. The results of these tests are given in Table 2 below.

TABLE 2

Molecular weight and Polydispersity of Example 1

| | Mn | Mw | Polydispersity |
| --- | --- | --- | --- |
| Example 1 | 8333 | 12561 | 1.51 |

The color and clarity of Example 1 were determined by HunterLab Spectrophotometer (ColorQuest® XE) as follows. A 20-mm Quartz cuvette was filled with the sample and then placed in the port holder of the instrument. The color and clarity of the samples were measured by the ColorQuest® XE. Methanol (HPLC grade) was used as the standardizing agent. The results of Example 1 are 1.7 haze value and 9.7 APHA.

The OH value of the Example was determined by Radiometer TitraLab® TM865 Autotitrator. A 4-5 gram sample was dissolved in 25 ml tetrahydrofuran (THF), then 25 ml p-toluenesulfonyl isocyanate (TSI) reagent was added volumetrically and stirred for 10 minutes. The sample was then titrated with 0.25 M concentration tetrabutylammonium hydroxide. The results were reported in mg KOH/g by the autotitrator. Example 1 was found to have an OH value of 2.4 mg KOH/g.

Example 2

The components and respective amounts used in Example 2 are shown in Table 3.

TABLE 3

| Component | Amount |
| --- | --- |
| 3-isocyanatomethyl-3,5,5-trimethylcyclohexyl isocyanate | 149.47 grams |
| Mixture of n-decyl acrylate and n-octyl acrylate (w/w ratio: 50/50) | 178.53 grams |
| Trisnonylphenylphosphite | 2.14 grams |
| Thiodiethylene bis[3-(3,5-di-tert-butyl-4-hydroxyphenyl)proprionate | 4.29 grams |
| Dibutyltin dilaurate | 1.71 grams |
| 2-hydroxyethyl acrylate | 79.57 grams |
| Krasol ® HLBH-P3000 | 1369.61 grams |

The OH/NCO molar ratio in this example was 1.12.

First, 149.47 grams of 3-isocyanatomethyl-3,5,5-trimethylcyclohexyl isocyanate, 178.53 grams of mixture of n-decyl acrylate and n-octyl acrylate, 2.14 grams of trisnonylphenylphosphite, 4.29 grams of thiodiethylene bis[3-(3,5-di-tert-butyl-4-hydroxyphenyl)proprionate and 1.71 grams of dibutyltin dilaurate were charged into a 3 L reaction flask equipped with an agitator, liquid addition funnel, thermometer and gas inlet tube. This mixture was heated to 40° C. under agitation and dry air sparge. Next, 79.57 grams 2-hydroxyethyl acrylate were charged over 25 minutes. After the exotherm, the flask was heated to 60° C. and held for 30 minutes. Then, 1369.61 grams Krasol® HLBH-P3000 were charged over 30 minutes. After the exotherm, the reactor was heated to 80° C. The reaction was held at 80° C. for at least 2 hours, until the level of NCO % was equal to or lower than 0.016%. The heater and agitation were turned off. Once the reactor temperature cooled to 60° C., the product was poured out into a container and testing on the final properties was performed.

Properties of Example 2

The molecular weight, polydispersity, color, clarity and OH values were measured using the same procedures as those described above for Example 1. The resulting product was an optically clear liquid having a viscosity of 3470 cps at 60° C.; a color of 10.8 APHA and 0.4 haze value at room temperature and an OH value of 8.6 mg KOH/g. The GPC results are shown in Table 4.

TABLE 4

Molecular weight and Polydispersity of Example 2

| | Mn | Mw | Polydispersity |
|---|---|---|---|
| Example 2 | 7074 | 9532 | 1.35 |

Optical Clarity of Films

Figure 1:
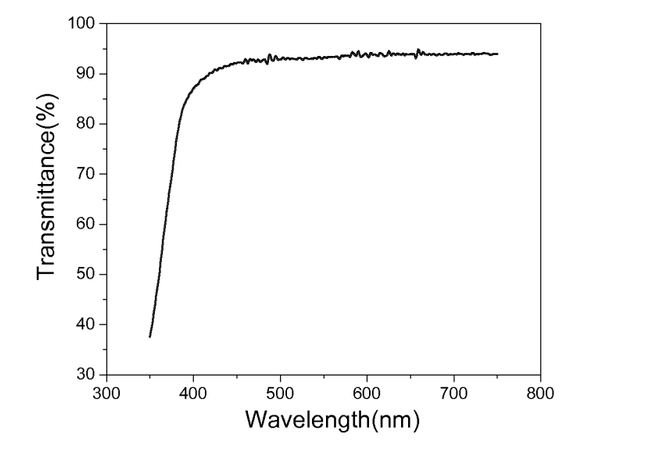
FIG. 1 is a graphical representation of transmittance achieved across a range of frequency values by the product of Example 2, which is made according to an embodiment of the present invention.

The resulting products were formulated with 5% Irgacure 184. The samples were drawn down onto PET films, followed by cure under INPRO mercury H lamp at a speed of 20 fpm. The curing energy is around 2 mJ/cm². Free-standing thin films were developed and tested to be at around 8 mils. The UV-vis spectra of free films were collected by Agilent 8453 UV-Visible Spectrophotometer. The optical clarity of Example 2 can achieve higher than 90% transmittance at the frequency from 430 nm to 750 nm, more specifically, 91.0% at 430 nm, 92.1% at 450 nm, 93.8% at 600 nm and 93.9% at 700 nm as shown in FIG. 1.

The invention claimed is:

1. A mixture of:
a polyurethane polymer or oligomer represented by the following Formula (I):

wherein:
$X^1$ and $X^2$ are each independently H or —C(=O)—NH—$R^4$—NH—C(=O)—O—$R^5$—[O—C(=O)—C($R^6$)=$CH_2$]$_m$, subject to the proviso that at least one of $X^1$ and $X^2$ is H;
n is an integer of from 1 to 20;
m is from 1 to 5;
$R^1$ and $R^3$ are each independently a polydiene segment or an alkoxylated polydiene segment, subject to the proviso that at least one of $R^1$ or $R^3$ is a hydrogenated polybutadiene;
$R^2$ and $R^4$ are each independently an organo residue of a diisocyanate;

$R^5$ is $C_2$ to $C_{10}$ alkylene or dialkylene ether and
$R^6$ is H or methyl,
and
a second polyurethane polymer or oligomer in accordance with following Formula (I')

wherein $X'^1$ and $X'^2$ are identical and correspond to a urethane group bearing from 1 to 5 (meth)acrylate groups according to —C(=O)—NH—$R^4$—NH—C(=O)—O—$R^5$—[O—C(=O)—C($R^6$)=$CH_2$]$_m$ and $R^1$, $R^2$, $R^3$, $R^4$, $R^5$, $R^6$, n, and m are same as defined above in formula (I).

2. The mixture of claim 1, wherein the hydrogenated polybutadiene comprises alkoxylated polybutadiene.

3. The mixture of claim 1, wherein the mixture has an OH value between 1.01 mg KOH/g and 20 mg KOH/g.

4. A curable composition comprising the mixture of claim 3.

5. The curable composition of claim 4, wherein the curable composition is curable by radiation or by peroxide cure or by dual cure or by cure with hydroxyl-reactive compounds.

6. The curable composition of claim 4, wherein the curable composition is a coating composition or an adhesive composition or a component for/in solar panels or a component in battery or in inkjet printing microcircuits, or a sealant composition or an encapsulant composition.

7. The curable composition of claim 4 further comprising at least one further component selected from the group consisting of reactive diluents, non-reactive diluents, fillers, colorants, pigments, matting agents, tackifiers, plasticizers, rheology modifiers, antioxidants, stabilizers, wetting agents, flowing agents, adhesion promoters, catalysts and initiators.

8. A material comprising the curable composition claim 4, wherein the material is selected from the group consisting of coatings, paints, varnishes, adhesives, sealants, caulks, graphic arts compositions, inks, flexographic printing plate compositions and encapsulant compositions.

9. The material of claim 8, wherein the material is an adhesive for use as a component of solar panels or as a component in battery or in inkjet printing microcircuits.

10. An electronic device comprising the adhesive of claim 9.

11. A method for making the mixture of claim 1, wherein the method comprises reacting an alcohol component A) with an isocyanate component B), wherein the molar ratio of OH/NCO is greater than 1 and wherein
the alcohol component A) comprises:
A1) at least one hydroxylated and optionally alkoxylated hydroxylated polydiene oligomer or polymer; and
A2) at least one hydroxyl-functional ethylenically unsaturated compound, which is a monomer or oligomer bearing at least one ethylenic unsaturation; and
the isocyanate component B) comprises at least one polyisocyanate with a functionality of at least 2.

12. The method of claim 11, further comprising forming a blend, wherein the blend comprises the alcohol component A), the isocyanate component B), at least one catalyst, optionally at least one inhibitor and optionally one or more (meth)acrylate-functionalized monomers as diluent.

13. The method of claim 12, wherein A2) and the isocyanate component are reacted to form an intermediate product and the intermediate product is then reacted with A1).

14. A method of preparing coatings or adhesive compositions comprising using the mixture of claim 1.

15. A cured adhesive formed by curing the mixture of claim 1.

16. The curable composition of claim 5, wherein the curable composition is curable by radiation and the radiation-curable composition is curable by UV, laser, LED or EB (electron beam).

* * * * *